United States Patent [11] 3,611,403

| [72] | Inventors | Saul R. Gilford;<br>Robert J. Emary; Robert L. Gorgone, all of<br>Oberlin, Ohio |
|---|---|---|
| [21] | Appl. No. | 27,832 |
| [22] | Filed | Apr. 13, 1970 |
| [45] | Patented | Oct. 5, 1971 |
| [73] | Assignee | Gilford Instrument Laboratories, Inc.<br>Oberlin, Ohio |

[54] TEST SAMPLE CONTAINER IDENTIFICATION METHOD AND APPARATUS
15 Claims, 4 Drawing Figs.

[52] U.S. Cl. ................................................. 346/1,
346/33 R, 73/423 A, 235/61.9 R, 235/61.11 C
[51] Int. Cl. ......................................................... G01d 5/00
[50] Field of Search .......................................... 346/33 R,
33 ME; 73/423 A, 53; 356/244, 246; 128/2 R;
235/61.9 R, 61.11 A, 61.11 C

[56] References Cited
UNITED STATES PATENTS

| 3,266,298 | 8/1966 | Whitehead et al. | 73/53 |
| 3,302,452 | 2/1967 | Leslie | 73/432 A UX |
| 3,430,495 | 3/1969 | Burge | 73/432 A |
| 3,526,125 | 9/1970 | Gilford et al. | 73/53 |

*Primary Examiner*—Joseph W. Hartary
*Attorney*—Silverman & Cass

ABSTRACT: A test sample rack or carrier for supporting a plurality of sample containers and transporting the same to a testing station for the testing of each sample. The carrier has an upstanding coding flange adapted to receive projecting coding buttons at predetermined locations thereon so that the same will activate a two-digit binary counting device as the carrier passes the testing station. The binary counting device supplies data identifying the carrier in connection with the test results for each sample so that the identifying data will be recorded together with the test results.

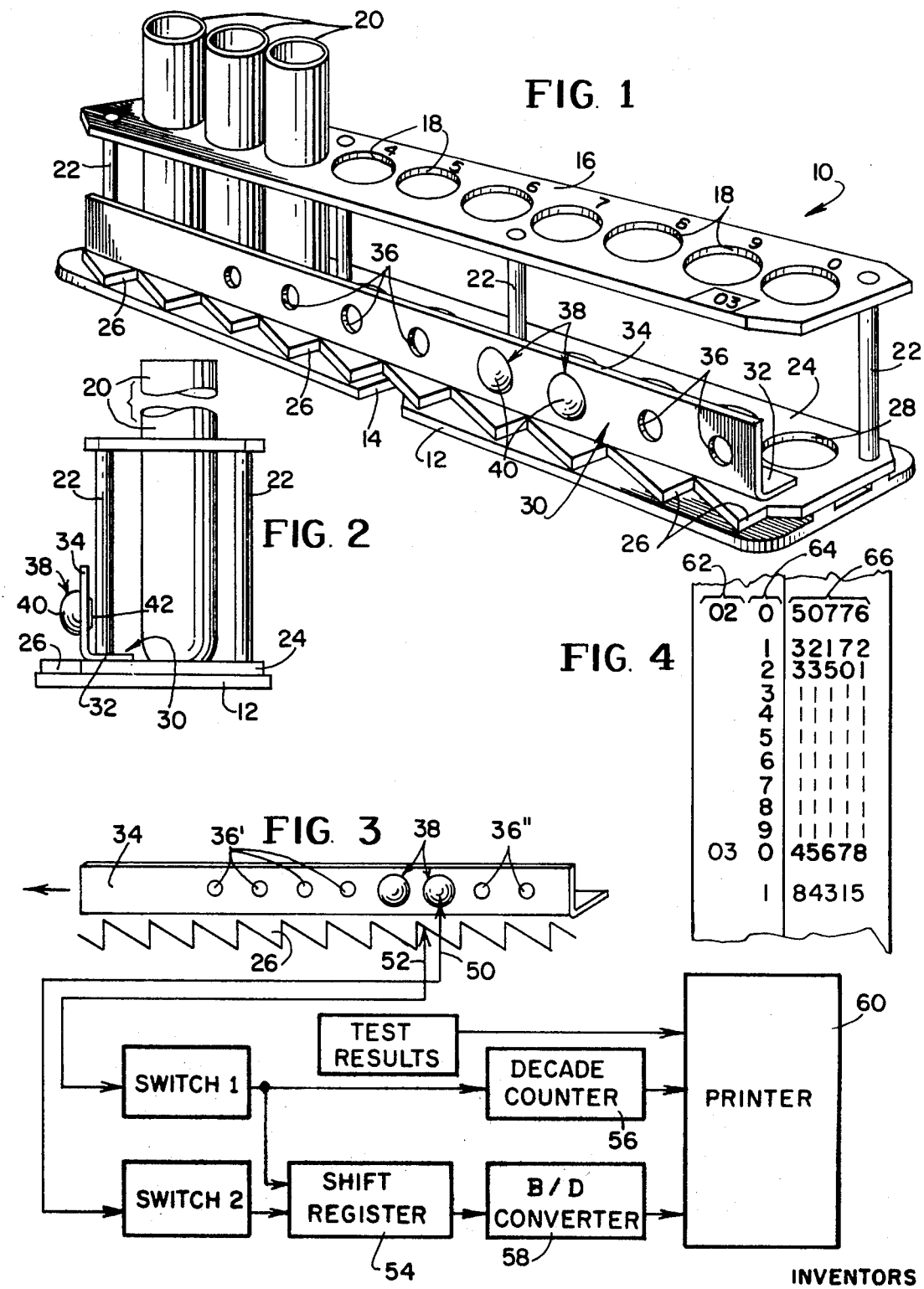

3,611,403

1

TEST SAMPLE CONTAINER IDENTIFICATION METHOD AND APPARATUS

CROSS-REFERENCE TO RELATED APPLICATION

The invention is particularly adaptable for use with the structure disclosed in U.S. application Ser. No. 816,360, now U.S. Pat. No. 3,552,536 filed Apr. 15, 1969 in the name of Robert J. Emary and entitled, "TEST SAMPLE CARRIER TRANSPORT APPARATUS." The inventor in the prior filed application is one of the named inventors in the application herein; both applications are owned by a common assignee.

BACKGROUND OF THE INVENTION

1. Field of the Invention

This invention relates generally to carriers for test sample containers, and more particularly, to means for identification of the carrier and its respective sample containers in connection with the test results for each sample.

2. Description of the Prior Art

There is disclosed in the aforementioned application a test sample carrier transport apparatus which permits 10 sample container carriers or racks to be loaded therein and automatically processed through a testing device, the output of which is converted to readable data on a printout tape. In the related application, no structure is provided for automatic identification of the particular sample tested together with the test result, thus making it necessary for the operator of the testing apparatus to match up the recorded test data with the container from which the sample was taken.

Automatic identification of the container which carries the sample upon which a test has been made is desirable in order to reduce the possibility of human error in matching the test result with the sample tested. Preferably, the identification of the container with the test result is made on the printout tape which records the test result. There are testing systems known in the art which print a sequential number adjacent consecutive test readout values, but these systems identify only the numerical sequence of testing and do not identify precisely, independent of the sequential order of testing, the carrier and container from which a sample has been taken.

SUMMARY OF THE INVENTION

The invention provides a carrier adapted to receive and transport a plurality of containers containing samples to be tested, the containers being retained on the carrier by a support plate and a base member. An indexing member positioned adjacent the base member provides a plurality of teeth which operate in conjunction with a test activating pusher to commence testing of the contents of an individual sample container as the same is moved adjacent a testing station of the testing apparatus and also to transmit the container position identification to the printer of the testing apparatus. An upstanding flange mounted on the indexing member faces the same direction as the teeth and carries in a predetermined position a number of code buttons adapted to pass before and activate a two-digit binary coding device as the carrier passes the testing station. The binary coded data, which identifies the particular sample container carrier, is transmitted to a decimal converter with the aid of the aforementioned indexing teeth, and subsequently to the printer of the test device. The sample container and carrier identification data is printed adjacent the sample test results for proper identification of the same.

The invention is such that effective use of sample carrier transport apparatus is achieved by permitting placement of a particular in a test device with no requirement for carefully keeping track of the sequential order thereof in relation to other carriers also transporting sample carriers. Because the particular carrier is properly identified at the time a sample test is taken, data transcription errors which occur through human recording are avoided.

2

BRIEF DESCRIPTION OF THE DRAWING

FIG. 1 is a perspective view of a sample container carrier or rack constructed in accordance with the invention.

FIG. 2 is an end elevational view of the sample container carrier illustrated in FIG. 1.

FIG. 3 is a schematic diagram showing the coding flange and indexing member of the invention and the operation thereof in connection with the testing and recording elements of a test sample apparatus.

FIG. 4 is a fragmentary view of a test data readout tape.

DESCRIPTION OF THE PREFERRED EMBODIMENT

Referring to FIG. 1, there is illustrated a sample container carrier or rack 10 which is illustrated in simplified form and capable of wide variation in construction. The carrier 10 has a base portion 12 provided with a notch 14 adapted to cooperate with a pushing member (not shown) for purposes of moving the carrier 10 through the various stages of a testing apparatus. The carrier has a support plate 16 provided with sockets 18 which hold the sample containers 20. Support plate 16 is mounted on support standards 22 suitably secured to base 12 by fasteners as shown. An indexing member 24 having teeth 26 is also secured by the same fasteners above the base 12 and held in place by the standards. The indexing member 24 serves the function of supporting the bottom ends of the containers 20 by means of the openings 28, and also of providing the teeth 26 which activate testing of the respective containers 20 as described in the aforementioned related application.

The structure above-described is disclosed in the referred to related application in connection with a test sample carrier transport apparatus in which a plurality of carriers 10 are transported past a testing station so that a test may be made of each of the samples retained in the carriers 20. As the carrier 10 is transported past the testing station, teeth 26 of indexing member 24 engage respectively a pusher member 52 (FIG. 3) to activate the testing cycle with respect to each container 20. Each socket 18 corresponds to a tooth 26 so that a test will be made of each of the samples carried by the rack 10.

The carrier 10 illustrated in FIGS. 1 and 2 is shown having the coding flange 30 of this invention mounted thereon. Flange 30 is of elongate, generally L-shaped construction extending substantially the length of the indexing member 28. A short leg 32 is mounted to the indexing member 24 and may be secured thereto by the same fasteners which secure the indexing member to the base 12. An upstanding leg 34 is formed normal to leg 32 and faces the same direction as the teeth 26. The upstanding leg 34 is provided with coding detents, a preferred form of which is illustrated as eight apertures 36 which are adapted to receive a predetermined number of coding buttons 38, two of which are illustrated in position in FIG. 1. Each coding button 38 includes an enlarged, hemispherical portion 40, and a smaller, flattened portion 42 connected to the enlarged portion 40 by a reduced diameter connecting member (not shown). The enlarged portion 40 is designed to protrude from the surface of the upstanding leg 34 and faces the same direction as the teeth 26. The smaller portion 42 retains the button 38 securely within the aperture 36. The buttons 38 are designed such that they can either be permanently fixed within selective apertures 36 or, if constructed of plastic material, they may be secured in removable fashion.

Looking now at FIG. 3, the operation of the coding flange 34 in conjunction with the sensing and recording elements of the testing apparatus is illustrated. The orientation of the apertures 36 is such that a two-digit binary coded readout can be obtained. Reading from left to right in FIG. 3, the first four apertures 36' are provided to designate the binary field for the first or tens digit of the binary data, and the last four apertures 36" are provided to designate the binary field for the second or units digit of the binary data, with the least significant bit position lying at the left end of each field. The binary format utilized by the invention is well known and will not be described further.

As seen in FIG. 3, switch 2 is connected for activation by its trip lever indicated schematically by arrow 50. Trip lever 50 is positioned adjacent leg 34 of flange 30 so that as the carrier 10 is moved through the testing station, the trip lever will be engaged by coding buttons 38. When vacant apertures 36' and 36'' pass before lever 50, the lever will remain in normal position and binary "zeros" will be transferred by switch 2. If, however, an aperture 36' or 36'' which is occupied by a coding button 38 passes before lever 50, the lever will be changed from normal to closed position and will cause switch 2 to transfer a binary "one" for recording as described below.

The lever 50 and its switch 2 operate in conjunction with the pusher 52 and its switch 1, which is activated by teeth 26 of the indexing member 24. Thus, as the carrier 10 is moved by the carrier transport apparatus (to the left as seen in FIG. 3), when each container approaches the testing station, its associated tooth 26 will be sensed by the pusher 52 to stop the carrier 10 for performance of the test operation. Just prior to activation of pusher 52, lever 50 will either remain in normal position if no coding button 38 is in associated aperture 36 or, lever 50 will change from normal to closed position if the aperture 36 has been provided with a coding button 38 as illustrated in FIG. 3. For each of at least eight stop positions on the sample carrier 10, there therefore corresponds a binary bit which provides the proper carrier identification.

The binary coded data transferred by switch 2 is entered into a buffer memory, which has been illustrated in the form of an eight bit serial entry shift register 54. Shift register 54 is clocked by each closure of pusher 52 and resultant activation of switch 1. At the same time, each closure of switch 1 is counted in a single decade counter 56 which accumulates a single count for each sample position. The binary data accumulated in shift register 54 is converted in a binary-to-decimal converter 58, and this information, together with the data from the decade counter and the test result data is transferred to a recorder or printer 60 for readout of the combined information.

A specimen of the printout tape for the test sample performed on the carrier 10 is illustrated in FIG. 4. The tape of FIG. 4 illustrates a complete set of data for one rack numerically indicated as "03." The data recorded in the column indicated by the reference numeral 62 is the information data which identifies the particular carrier which transports the containers upon which tests have been performed. The second column of recorded data indicated by the reference numeral 64 designates the particular container of the designated carrier which has passed the test station. The third column 66 designates a numerical indication of the test results. Thus, the first numeral "02" in column 62 and the second numeral "0" in column 64 indicate that the test result "50776" in column 66 has been performed on container "0" of carrier 02. Looking down the columns, the next numeral immediately below the "0" entry in column 64 indicates a test result for container "1." The particular carrier upon which this container is transported is not completely identified until the last container "0" of this carrier has been tested. Thus, adjacent the lower entry "0" in column 64 there appears, in column 62, the entry " 03" which identifies the carrier illustrated in FIG. 1, and the test results performed on the last container carried thereby. For purposes of coordinating the readout entries with the carrier of FIG. 1, the carrier itself carries the indication "03" inscribed thereon, and each of the sockets 18 also is designated by an inscribed numeral which corresponds to the tape readout data recorded in column 64. Spaces are provided between each carrier test result on the tape of FIG. 4 so that a complete set of test results for each carrier is clearly set out.

The particular manner of recording and printing the test results and transferring the binary data to the readout tape is capable of wide variation. The structure disclosed however, has been found to satisfy the desirability of properly identifying the particular carrier on which tests have been performed. The structure is simple and economical and satisfies the need to provide full recognition of groups of samples which are tested. The structure also permits any random rack to be individually identified regardless of particular placement thereof within a carrier transport apparatus.

What it is desired to be secured by Letters Patent of the United States is:

We claim:

1. A method of correlating, for automatic recording purposes, the test results obtained from the testing of the contents of sample containers, residing in particular positions in particular container carriers, with an identification of each sample container position and its container carrier, said method comprising the steps of: affixing to each said container carrier mechanically oriented machine readable indicia identifying each said carrier, indexing each said carrier for incremental movement past a testing station in such manner that the position of each said container corresponds to a particular increment of movement, sensing electromechanically the mechanically oriented indicia, sensing electromechanically said carrier indexing to form carrier position data, and correlating said sensed indicia and position data whereby said correlated indicia and data form carrier identification data which can be recorded with test results, such that the tests results are positively associated with carrier identification.

2. A method as claimed in claim 1 in which said indicia sensing is accomplished in a binary mode and said correlating is accomplished by clocking a shift registered store for the binary bits of the sensed indicia data.

3. A method as claimed in claim 1 in which the said step of sensing the carrier indexing container position data is employed for producing.

4. A method as claimed in claim 3 including the step of recording, at the same time for each container, said container position data and its associated container test result data, and recording said carrier identification data coterminously with said data recording for the containers of said carrier.

5. Apparatus for identification of a carrier for supporting sample containers, said carrier moving past a test station for testing the contents of the containers for producing testing data, said apparatus correlating identification of said carrier, identification of said containers and said testing data said carrier having thereon indexing means for selectively stopping the carrier at the test station relative to a sample container, said apparatus comprising: a coding member mounted on said carrier, the coding member having machine readable identification means for identification of said carrier, programming means including switch closure structure arranged to be selectively operated by said identification means and said indexing means for sensing the identification of said carrier as the carrier moves past the testing station and for programming the transmission of the carrier identification in correlation with the producing of the testing data.

6. Apparatus as claimed in claim 5 in which said identification means comprise coding detents spaced along said coding member at predetermined locations, said detents being adapted to activate said switch closure structure to transmit identification data to said programming means, said indexing means also being coupled to said programming means to cause said programming means to be responsive to said selective stopping of said carrier at said test station for programming transmission of each sample container identity for correlation with the test value of its contents.

7. Apparatus as claimed in claim 6 in which said programming means comprise a buffer memory and a binary-to-decimal converter adapted to receive the carrier identification data in binary format from said switch closure structure.

8. Apparatus as claimed in claim 7 in which an input to said buffer memory also is coupled to said indexing means for causing the buffer to empty into the binary-to-decimal converter in time relation to the selective stopping movement of the carrier.

9. Apparatus as claimed in claim 8 in which said programming means further includes a decade counter having an input coupled to said indexing means which causes said decade counter to be responsive to the selective stopping of the carrier to identify for recording purposes the container then in the test position.

10. Apparatus as claimed in claim 9 which further comprises recording means coupled to receive the outputs of said decade counter, said binary-to-decimal converter and the testing station for providing a record format for positive association between sample test result, container position and carrier.

11. Apparatus as claimed in claim 8 in which said carrier is of elongate generally rectangular configuration, said coding member comprising an upstanding flange along one long edge of said carrier, and said carrier identification means includes at least one coding button secured to said flange at a data transferable position along said flange.

12. Apparatus as claimed in claim 5 in which said carrier is of elongate generally rectangular configuration and said coding member comprises an upstanding flange along one long edge of said carrier.

13. Apparatus as claimed in claim 12 in which said carrier identification means comprise at least one coding button secured to said flange at a data translatable position along said coding member.

14. Apparatus as claimed in claim 13 in which said coding buttons each comprise an enlarged portion protruding from the surface of said flange, and said flange has apertures spaced therealong elective receipt of said portions.

15. Apparatus as claimed in claim 14 in which said apertures define a pair of binary data fields, in which the presence and absence of a coding button therein defines a characteristic binary bit.

PO-1050
(5/69)

UNITED STATES PATENT OFFICE
CERTIFICATE OF CORRECTION

Patent No. 3,611,403     Dated October 5, 1971

Inventor(s) SAUL R. GILFORD et al.

It is certified that error appears in the above-identified patent and that said Letters Patent are hereby corrected as shown below:

Column 1, line 70, after "particular" insert --carrier--,
Column 4, line 29 delete " container position data"; line 30 after "producing" insert --container position data--.

Signed and sealed this 18th day of April 1972.

(SEAL)
Attest:

EDWARD M. FLETCHER, JR.          ROBERT GOTTSCHALK
Attesting Officer                Commissioner of Patents